US012663053B2

(12) United States Patent (10) Patent No.: US 12,663,053 B2
Sato (45) Date of Patent: Jun. 23, 2026

(54) TUBULAR VIBRATION DAMPING DEVICE

(71) Applicant: Sumitomo Riko Company Limited,
Aichi (JP)

(72) Inventor: Kuninori Sato, Aichi (JP)

(73) Assignee: Sumitomo Riko Company Limited,
Aichi (JP)

( * ) Notice: Subject to any disclaimer, the term of this
patent is extended or adjusted under 35
U.S.C. 154(b) by 370 days.

(21) Appl. No.: 18/460,582

(22) Filed: Sep. 3, 2023

(65) Prior Publication Data

US 2024/0110608 A1      Apr. 4, 2024

(30) Foreign Application Priority Data

Sep. 30, 2022      (JP) .................................. 2022-157595

(51) Int. Cl.
*F16F 1/38*          (2006.01)
*F16F 7/108*        (2006.01)
(52) U.S. Cl.
CPC ............ *F16F 1/3835* (2013.01); *F16F 7/108*
(2013.01); *F16F 2222/08* (2013.01); *F16F*
*2230/0047* (2013.01); *F16F 2230/02*
(2013.01); *F16F 2234/02* (2013.01)
(58) Field of Classification Search
CPC .. F16F 1/38; F16F 1/3835; F16F 7/108; F16F
2222/08; F16F 2230/0047; F16F 2230/02;
F16F 2234/02
See application file for complete search history.

(56) References Cited

U.S. PATENT DOCUMENTS 4,465,296 A * 8/1984 Shiratori .............. B60G 15/068
267/221
6,394,436 B1 * 5/2002 Schnaars .............. B60G 13/003
280/124.147

(Continued)

FOREIGN PATENT DOCUMENTS

JP        H109336        1/1998
JP        2001280420      10/2001

(Continued)

OTHER PUBLICATIONS

"Notice of Reasons for Refusal of Japan Counterpart Application",
issued on Feb. 27, 2026, with English translation thereof, p. 1-p. 5.

*Primary Examiner* — Thomas W Irvin
(74) *Attorney, Agent, or Firm* — JCIPRNET

(57) ABSTRACT

A tubular vibration damping device includes an inner shaft
member and an outer tubular member connected by a main
rubber elastic body. A plurality of first identification protru-
sions protruding outward are formed apart in a circumfer-
ential direction on one axial end surface of the main rubber
elastic body, and a plurality of second identification protru-
sions protruding outward are formed apart in the circumfer-
ential direction on another axial end surface. The first
identification protrusion and the second identification pro-
trusion are arranged at positions differing from each other in
the circumferential direction in an axial projection, and the
first identification protrusion and the second identification
protrusion have a comprehensive overall pattern in which
weight balance is maintained on a central axis of the main
rubber elastic body.

9 Claims, 8 Drawing Sheets

(56)     References Cited

U.S. PATENT DOCUMENTS

| | | | |
|---|---|---|---|
| 6,499,730 B1 * | 12/2002 | Kuwayama ............. | F16F 7/108 |
| | | | 267/141 |
| 6,588,780 B2 * | 7/2003 | Hayashi ............... | B60G 15/068 |
| | | | 280/124.147 |
| 6,682,060 B2 * | 1/2004 | Kato ....................... | F16F 15/10 |
| | | | 267/141 |
| 6,883,653 B2 * | 4/2005 | Kato ................... | F16F 15/1442 |
| | | | 188/379 |
| 6,908,076 B2 * | 6/2005 | Hayashi ............... | F16F 1/3814 |
| | | | 280/124.155 |
| 10,655,703 B2 * | 5/2020 | Akiyama ................... | F16F 9/54 |
| 11,320,014 B2 * | 5/2022 | Gendron .............. | F16F 1/3828 |
| 11,548,341 B2 * | 1/2023 | Otsu ....................... | B60G 11/16 |
| 2004/0084601 A1 * | 5/2004 | Kato ....................... | F16F 13/16 |
| | | | 248/562 |
| 2021/0164531 A1 * | 6/2021 | Gendron .............. | F16F 1/3828 |
| 2025/0146552 A1 * | 5/2025 | Matsui .................... | B60K 5/12 |

FOREIGN PATENT DOCUMENTS

| | | | |
|---|---|---|---|
| JP | 4833946 | | 12/2011 |
| JP | 4833946 B2 * | | 12/2011 |

* cited by examiner

TUBULAR VIBRATION DAMPING DEVICE

CROSS-REFERENCE TO RELATED APPLICATION

This application claims the priority benefit of Japan application serial no. 2022-157595, filed on Sep. 30, 2022. The entirety of the above-mentioned patent application is hereby incorporated by reference herein and made a part of this specification.

BACKGROUND

Technical Field

The disclosure relates to a tubular vibration damping device having a basic structure in which an inner shaft member and an outer tubular member are connected by a main rubber elastic body.

Related Art

Conventionally, a tubular vibration damping device has been known as a type of vibration damping device used for a member constituting a vibration transmission system. Specifically, for example, in vehicles such as automobiles, the tubular vibration damping device is used as a power unit mount supporting a power unit including an engine or a motor, a suspension bush, a body mount, or a dynamic damper. Such a tubular vibration damping device generally has a structure in which an inner shaft member and an outer cylinder metal fitting are connected by a main rubber elastic body, as shown in Japanese Patent Application Laid-Open No. H10-9336 (Patent Document 1).

In such a tubular vibration damping device, it may be required to label identification signs. For example, in the case where it is required to distinguish and install similar but different types of tubular vibration damping devices or in the case where it is required to align a specific axially perpendicular direction in a predetermined orientation for installation, identification signs specifying the type of the tubular vibration damping device or identification signs indicating a specific axially perpendicular direction may be labeled.

Such identification signs are required to be visually recognizable, and identification signs formed by painting on the surface of the tubular vibration damping device may be adopted. However, it not only requires a special painting process, but it is also difficult to stably form identification signs with paint. Also, damage such as paint peeling is likely to occur during transportation before installation.

As shown in Japanese Patent No. 4833946 (Patent Document 2), it is also conceivable to integrally form an identification protrusion protruding from one end surface of the main rubber elastic body. However, the inventor of the disclosure has examined the identification protrusion described in Patent Document 2 and has found that, with the formation of the identification protrusion, spring properties and thus the original vibration damping properties of the main rubber elastic body are likely to be adversely affected, and there is also a risk of a decrease in durability of the main rubber elastic body.

SUMMARY

The following describes exemplary aspects for understanding the disclosure. However, each aspect described below is provided as an example and may be appropriately combined with each other. Also, multiple components described in each aspect may be recognized and adopted independently wherever possible, and may also be appropriately combined with any component described in other aspects. Thus, in the disclosure, various alternative aspects may be realized without being limited to the aspects described below.

A first aspect is a tubular vibration damping device in which an inner shaft member and an outer tubular member are connected by a main rubber elastic body. A plurality of first identification protrusions protruding outward are formed apart in a circumferential direction on one axial end surface of the main rubber elastic body, and a plurality of second identification protrusions protruding outward are formed apart in the circumferential direction on another axial end surface. The first identification protrusion and the second identification protrusion are arranged at positions differing from each other in the circumferential direction in an axial projection. The first identification protrusion and the second identification protrusion have a comprehensive overall pattern in which weight balance is comprehensively maintained on a central axis of the main rubber elastic body.

According to this aspect, since a plurality of first identification protrusions and a plurality of second identification protrusions provided on the end surfaces on two sides in the axial direction are formed apart from each other in the circumferential direction, compared to an annular identification protrusion continuous in the circumferential direction as shown in FIG. 6 of Patent Document 2, for example, the influence on the main rubber elastic body is dispersed. Thus, the adverse effect on spring properties resulting from the identification protrusions integrally formed with the main rubber elastic body is mitigated, and dispersion of stress and strain during an external force action is achieved to mitigate a decrease in durability.

Moreover, since the first identification protrusion and the second identification protrusion have a comprehensive overall pattern in which weight balance is maintained on the central axis of the main rubber elastic body, it becomes possible to mitigate or avoid occurrence of directionality in the spring properties in the axially perpendicular direction of the main rubber elastic body accompanying the formation of the first identification protrusion and the second identification protrusion, i.e., mitigating or avoiding large variations at circumferential positions of the spring properties in the axially perpendicular direction. Thus, for example, in a tubular vibration damping device that does not have specific directionality (anisotropy) regarding the spring properties in the axially perpendicular direction, it becomes possible to eliminate the need for position alignment in the axially perpendicular direction during installation.

Furthermore, the comprehensive overall pattern of the first identification protrusion and the second identification protrusion is configured such that weight balance is maintained on the central axis of the main rubber elastic body. In other words, as can be understood from several embodiments to be described later, in an embodiment (embodiment in an axial view) in which a plurality of first identification protrusions and a plurality of second identification protrusions, which are formed to protrude on the axial end surfaces of the main rubber elastic body, are arranged on one plane extending in the axially perpendicular direction, the comprehensive center of gravity of all of the first identification protrusions and the second identification protrusions is positioned on the central axis of the main rubber elastic body. Further, the term "pattern" refers to not only the shape and size of the identification protrusions but also their positions on a plane extending in the axially perpendicular direction. Thus, according to the disclosure, even if the projection area on a plane extending in the axially perpendicular direction is the same, it is possible to handle identification protrusions with different heights protruding from the main rubber elastic body as having different degrees of effects such as deformation restraining force and weight on the main rubber elastic body. As a result, it is possible to accurately grasp the influence of each identification protrusion and well achieve the original vibration damping properties and durability in the tubular vibration damping device.

According to a second aspect, in the tubular vibration damping device of the first aspect, an overall pattern of the plurality of first identification protrusions is the same as an overall pattern of the plurality of second identification protrusions.

According to this aspect, since the first identification protrusion and the second identification protrusion have a same overall pattern as each other, it becomes easier to maintain substantially equal balance in properties on two sides in the axial direction of the main rubber elastic body. As a result, it becomes possible to mitigate or avoid variations in properties and durability in the axial direction of the main rubber elastic body resulting from the first identification protrusion and the second identification protrusion.

According to a third aspect, in the tubular vibration damping device of the first or second aspect, the plurality of first identification protrusions have a same size and a same shape, and the plurality of second identification protrusions have a same size and a same shape.

According to this aspect, variations in the influence (e.g., degree of concentration of stress or strain during an external force action) on the main rubber elastic body are mitigated or avoided among the plurality of first identification protrusions and among the plurality of second identification protrusions. Thus, it becomes even easier to mitigate changes in properties and occurrence of variations in the circumferential direction or suppress a decrease in durability resulting from the identification protrusions at each end of the main rubber elastic body.

According to a fourth aspect, in the tubular vibration damping device of any one of the first to third aspects, both the first identification protrusion and the second identification protrusion extend in an axially perpendicular direction with a constant width dimension.

According to this aspect, since a plurality of first identification protrusions and a plurality of second identification protrusions extending in the axially perpendicular directions with substantially constant width dimensions in the axially perpendicular directions are provided apart in the circumferential direction, it becomes easy to tune or set, for example, the spring properties in the axially perpendicular direction of the main rubber elastic body including such first identification protrusions and second identification protrusions, while suppressing the influence on the spring properties in the axial direction. In this aspect, for example, with a structure bridging between the inner shaft member and the outer tubular member provided in the main rubber elastic body, the first identification protrusion and the second identification protrusion may be formed in lengths in axially perpendicular directions spanning substantially between the inner shaft member and the outer tubular member.

According to a fifth aspect, in the tubular vibration damping device of any one of the first to fourth aspects, the first identification protrusion and the second identification protrusion do not overlap with each other in the axial projection.

According to this aspect, it becomes easy to mitigate or avoid excessive influence on the spring properties of the main rubber elastic body resulting from each of the plurality of first identification protrusions and the plurality of second identification protrusions.

According to a sixth aspect, in the tubular vibration damping device of any one of the first to fifth aspects, the first identification protrusion and the second identification protrusion are provided in a same quantity as each other and are arranged alternately in the circumferential direction in the axial projection.

According to this aspect, by arranging the first identification protrusion and the second identification protrusion alternately in the circumferential direction in the axial projection, it becomes easy to mitigate or avoid anisotropy in the circumferential direction such as spring properties in the axially perpendicular direction of the main rubber elastic body, in both the comprehensive overall pattern composed of the first identification protrusion and the second identification protrusion and each of the overall patterns of the plurality of first identification protrusions and the plurality of second identification protrusions.

According to a seventh aspect, in the tubular vibration damping device of any one of the first to sixth aspects, both the first identification protrusion and the second identification protrusion are arranged at equal intervals in the circumferential direction.

In this aspect as well, similar to the sixth aspect, it becomes easy to mitigate or avoid anisotropy in the circumferential direction such as spring properties in the axially perpendicular direction of the main rubber elastic body, in both the comprehensive overall pattern composed of the first identification protrusion and the second identification protrusion and each of the overall patterns of the plurality of first identification protrusions and the plurality of second identification protrusions.

According to an eighth aspect, in the tubular vibration damping device of any one of the first to seventh aspects, four or more first identification protrusions are formed in the circumferential direction, and four or more second identification protrusions are formed in the circumferential direction.

According to this aspect, it becomes easy to further mitigate anisotropy in the circumferential direction resulting from the plurality of first identification protrusions and the plurality of second identification protrusions. Each of the first identification protrusion and the second identification protrusion may be set to be 10 or fewer identification protrusions in the circumferential direction, and/or, in the circumferential direction on each axial end surface of the main rubber elastic body, the portions where the identification protrusions are formed are smaller than the portions where the identification protrusions are not formed. As a result, it is possible to mitigate excessive influence on the main rubber elastic body resulting from the identification protrusions.

According to a ninth aspect, in the tubular vibration damping device of any one of the first to eighth aspects, with the inner shaft member attached to a vibration control target, the outer tubular member serves as a mass member to constitute a dynamic damper.

According to this aspect, it is possible to provide a dynamic damper capable of exhibiting the effects described in any one of the first to eighth aspects.

According to the tubular vibration damping device of the disclosure, it is possible to provide an identification protrusion capable of exhibiting a good identification function on a main rubber elastic body, while avoiding adverse effects on vibration damping properties and a decrease in durability accompanying the formation of the identification protrusion as in the invention described in Patent Document 2.

DESCRIPTION OF THE EMBODIMENTS

Figure 1:
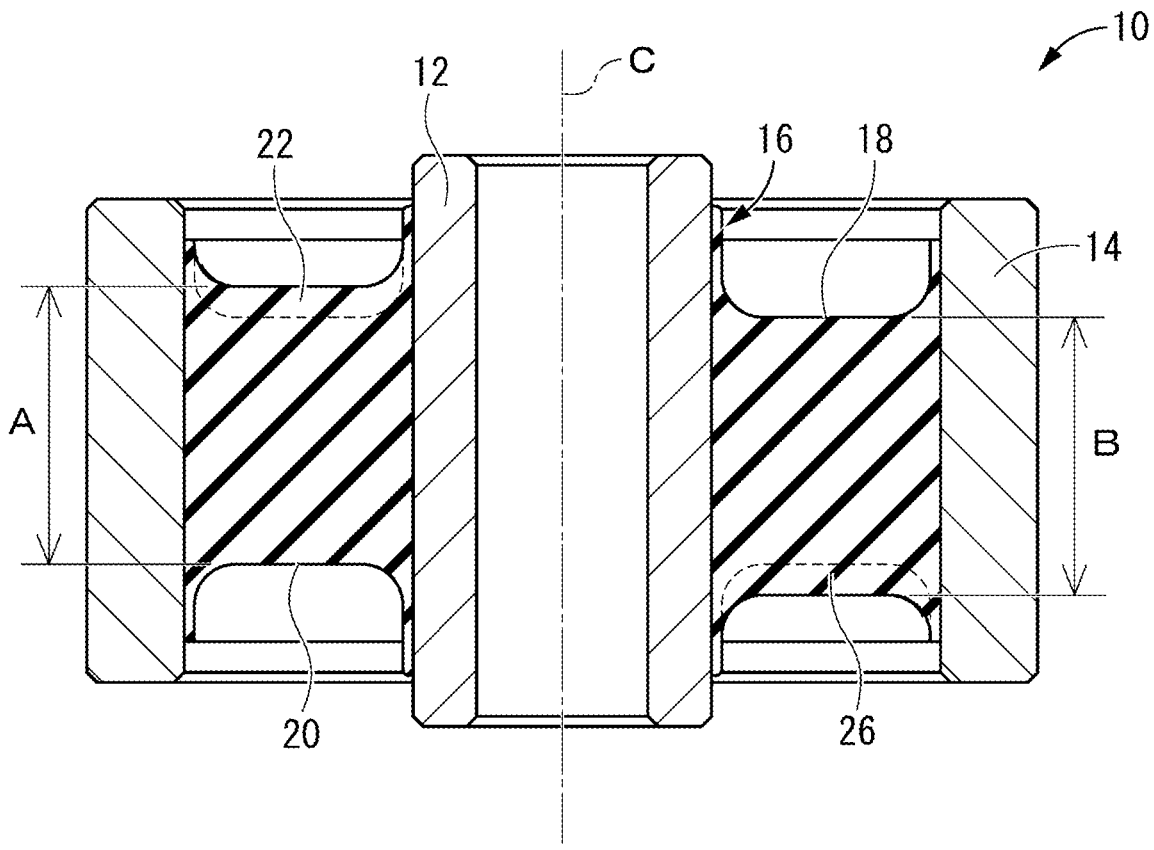
FIG. 1 is a longitudinal cross-sectional view showing a tubular vibration damping device as a first embodiment of the disclosure, and is a cross-sectional view taken along line I-I in FIG. 2.

Embodiments of the disclosure provide a tubular vibration damping device of a novel structure in which an identification protrusion capable of exhibiting a good identification function can be provided on a main rubber elastic body, while avoiding adverse effects on vibration damping properties and a decrease in durability accompanying the formation of the identification protrusion as in the invention described in Patent Document 2.

Hereinafter, embodiments of the disclosure will be described in detail with reference to the drawings to more specifically illustrate the disclosure.

First, in FIG. 1 to FIG. 4, a dynamic damper 10 is shown as a first embodiment of a tubular vibration damping device according to the disclosure. The dynamic damper 10 has a structure in which an inner shaft member 12 and an outer tubular member 14 are elastically connected by a main rubber elastic body 16 in a tubular shape. Although the orientation in which the dynamic damper 10 is arranged is not particularly limited, in the following description, an up-down direction basically refers to an up-down direction in FIG. 1, which is a central axis C direction of the main rubber elastic body 16. Further, as two axes orthogonal to the central axis C of the main rubber elastic body 16, a left-right direction in FIG. 2 will be described as a front-rear direction in the following description, and an up-down direction in FIG. 2 will be described as a left-right direction in the following description.

More specifically, the inner shaft member 12 is a high-rigidity member formed of a metal or synthetic resin, and has a substantially cylindrical shape with a small diameter extending substantially straight in the up-down direction. Further, the outer tubular member 14 is a high-rigidity member formed of a material similar to that of the inner shaft member 12, and has a substantially cylindrical shape with a large diameter extending substantially straight in the up-down direction.

Then, the outer tubular member 14 is externally fitted to the inner shaft member 12 to arrange the inner shaft member 12 and the outer tubular member 14 coaxially with each other and elastically connect the inner shaft member 12 and the outer tubular member 14 to each other by the main rubber elastic body 16. The main rubber elastic body 16 is a rubber elastic body in a substantially thick-walled cylindrical shape, and has an inner peripheral surface that is vulcanized and bonded to an outer peripheral surface of the inner shaft member 12, and an outer peripheral surface that is vulcanized and bonded to an inner peripheral surface of the outer tubular member 14. In this embodiment, the main rubber elastic body 16 is formed as an integral vulcanized molded product including the inner shaft member 12 and the outer tubular member 14.

An upper surface 18, which is one axial end surface of the main rubber elastic body 16, is a curved surface extending in the circumferential direction with a concave curved cross-section opened upward. Further, a lower surface 20, which is another axial end surface of the main rubber elastic body 16, is a curved surface extending in the circumferential direction with a concave curved cross-section opened downward.

Then, by inserting a bolt (not shown) to the inner shaft member 12 to attach to a member that serves as a vibration control target, the tubular vibration damping device according to this embodiment is configured as a dynamic damper 10 with the outer tubular member 14 serving as a mass member in a tubular shape. As a result, vibration inputted from the vibration control target is suppressed by a vibration absorbing action due to elastic deformation of the main rubber elastic body 16.

Figure 2:
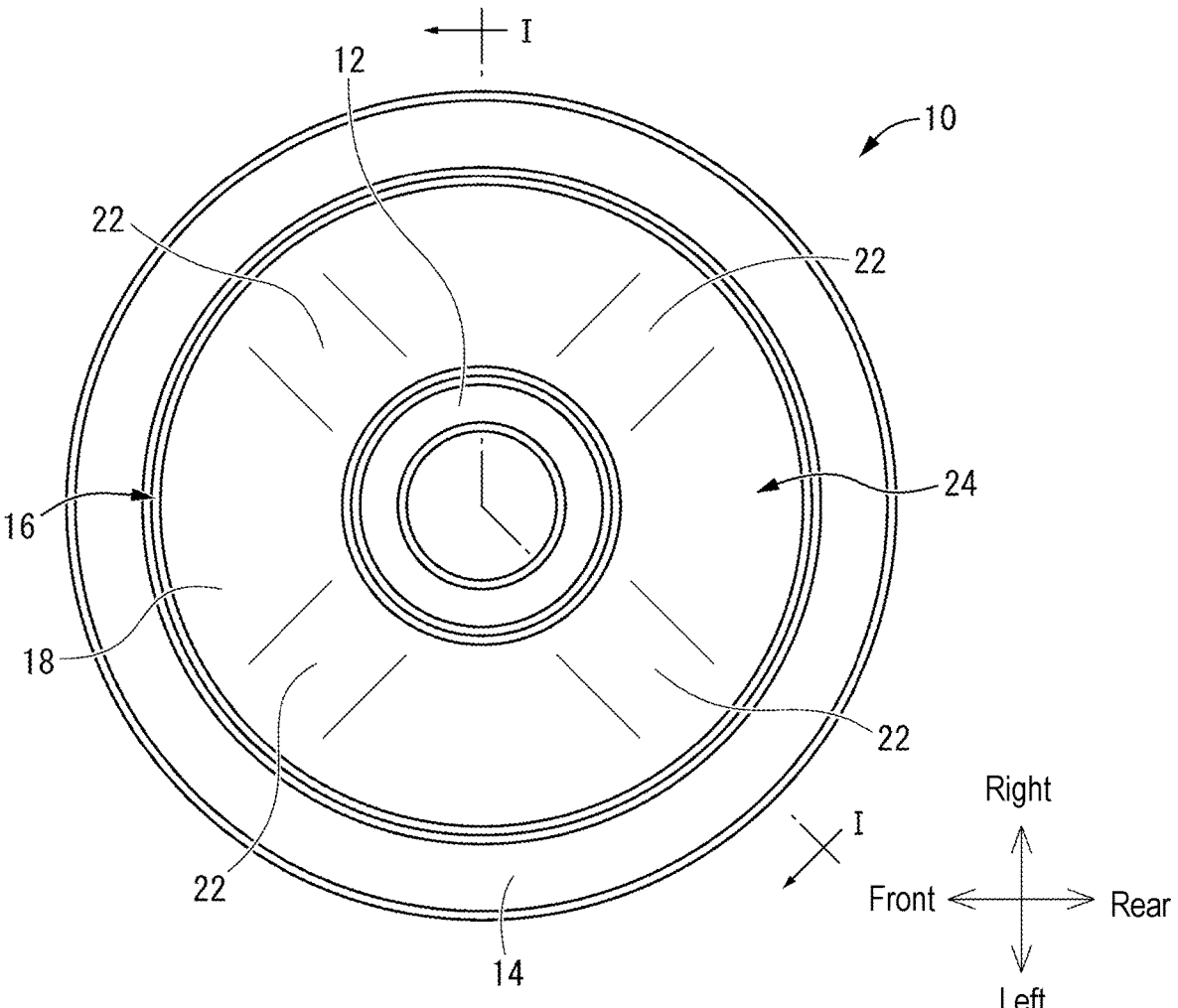
FIG. 2 is a plan view of the tubular vibration damping device shown in FIG. 1.

As shown in FIG. 1 and FIG. 2, a plurality of first identification protrusions 22 protruding outward (upward) are formed apart in the circumferential direction on the upper surface 18 of the main rubber elastic body 16. In this embodiment, four first identification protrusions 22 are formed in the circumferential direction and are arranged at substantially equal intervals (at intervals of approximately 90 degrees) in the circumferential direction. Further, each of the first identification protrusions 22 is provided in the same size and shape as each other, and extends in an axially perpendicular direction (i.e., a direction orthogonal to the up-down direction) with a substantially constant width dimension. In particular, in this embodiment, as shown in FIG. 1, each of the first identification protrusions 22 extends to connect (bridge) the inner shaft member 12 and the outer tubular member 14. A protruding height of each of the first identification protrusions 22 from the upper surface 18 does not exceed an inner peripheral end or an outer peripheral end of the main rubber elastic body 16. The upper surface 18 of the main rubber elastic body 16 is configured as a whole as a curved surface extending in the circumferential direction and opened upward, and is shaped to be partially raised at the forming position of each of the first identification protrusions 22.

In brief, as shown in FIG. 2, four first identification protrusions 22 are formed at substantially equal intervals in the circumferential direction and each extend in an axially perpendicular direction with a substantially constant width dimension to connect the inner shaft member 12 and the outer tubular member 14. As a result, the first identification protrusions 22 are arranged in a first pattern 24 as an overall pattern as described above. Then, each of the first identification protrusions 22 having such a first pattern 24 extends diagonally at an inclination angle of 45 degrees with respect to the front-rear direction and the left-right direction in a state in which the dynamic damper 10 is arranged as shown in FIG. 1 to FIG. 3.

Figure 3:
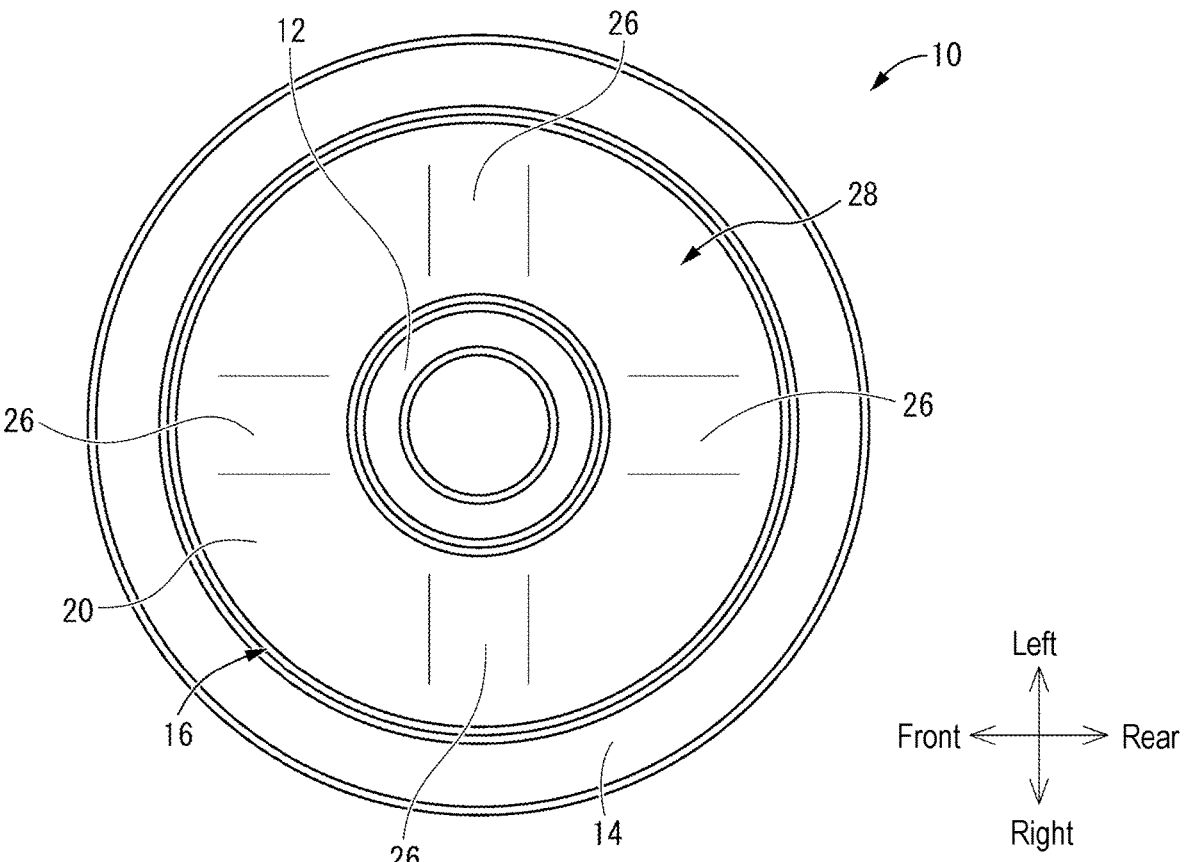
FIG. 3 is a bottom view of the tubular vibration damping device shown in FIG. 1.

Further, as shown in FIG. 1 and FIG. 3, a plurality of second identification protrusions 26 protruding outward (downward) are formed apart in the circumferential direction on the lower surface 20 of the main rubber elastic body 16. In this embodiment, four second identification protrusions 26 are formed in the circumferential direction and are arranged at substantially equal intervals (at intervals of approximately 90 degrees) in the circumferential direction. Further, each of the second identification protrusions 26 is provided in the same size and shape as each other, and extends in an axially perpendicular direction with a substantially constant width dimension. In particular, in this embodiment, the second identification protrusion 26 is provided in the same size and shape as the first identification protrusion 22, and as shown in FIG. 1, each of the second identification protrusions 26 extends to connect (bridge) the inner shaft member 12 and the outer tubular member 14. A protruding height of each of the second identification protrusions 26 from the lower surface 20 is configured to be substantially equal to that of each of the first identification protrusions 22 and does not exceed the inner peripheral end or the outer peripheral end of the main rubber elastic body 16. Thus, the lower surface 20 of the main rubber elastic body 16 is also configured as a whole as a curved surface extending in the circumferential direction and opened downward, and is shaped to be partially raised at the forming position of each of the second identification protrusions 26.

In brief, as shown in FIG. 3, four second identification protrusions 26 are formed at substantially equal intervals in the circumferential direction and each extend in an axially perpendicular direction with a substantially constant width dimension to connect the inner shaft member 12 and the outer tubular member 14. As a result, the second identification protrusions 26 are arranged in a second pattern 28 as an overall pattern as described above. Then, each of the second identification protrusions 26 having such a second pattern 28 extends in the front-rear direction and the left-right direction in a state in which the dynamic damper 10 is arranged as shown in FIG. 1 to FIG. 3.

Figure 4:
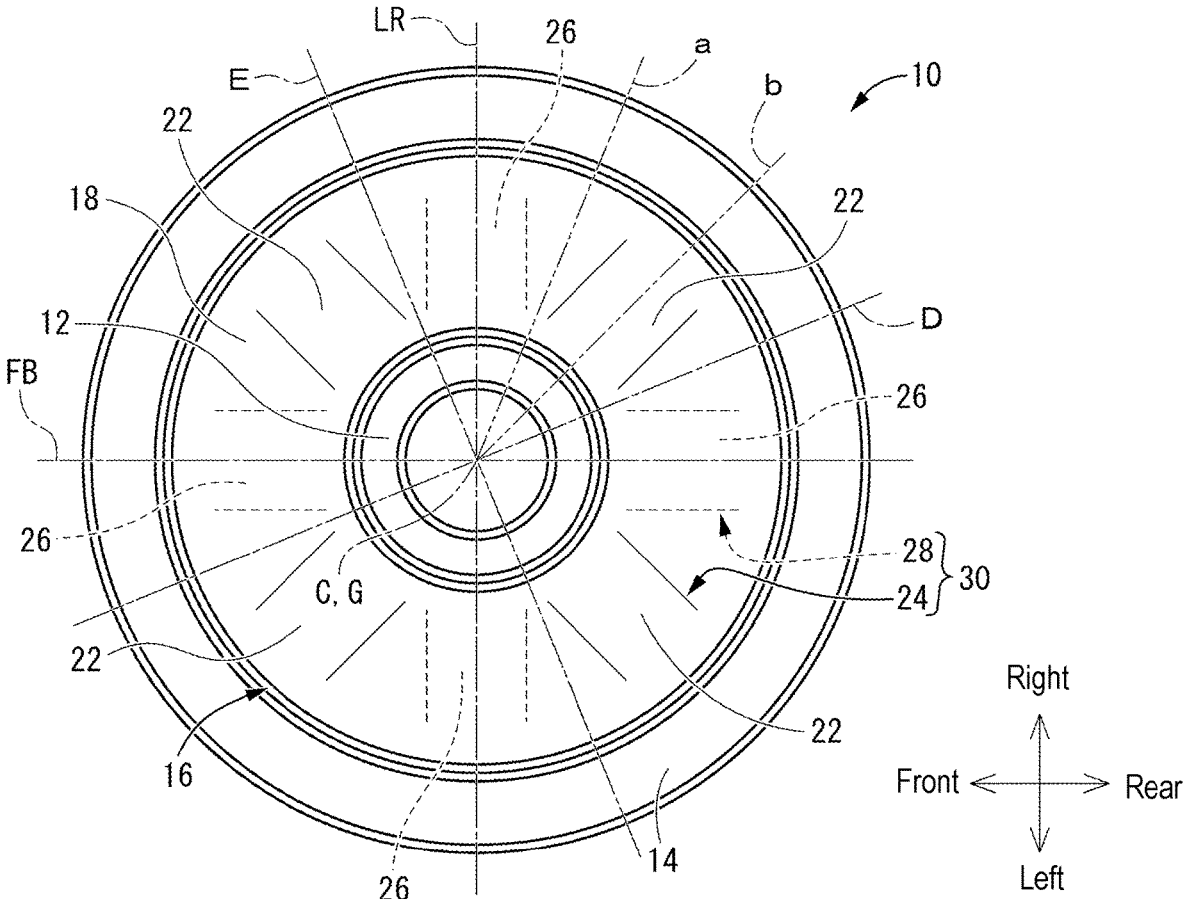
FIG. 4 is a view showing an axial projection from a plane side of the tubular vibration damping device shown in FIG. 1.

FIG. 4 shows a projection view in the axial direction from above the dynamic damper 10, and the first identification protrusions 22 (first pattern 24) and the second identification protrusions 26 (second pattern 28) are collectively shown in FIG. 4. That is, the first pattern 24 composed of each of the first identification protrusions 22 and the second pattern 28 composed of each of the second identification protrusions 26 are the same as each other as a whole. However, the first identification protrusion 22 and the second identification protrusion 26 are arranged shifted by 45 degrees from each other around the center axis C of the main rubber elastic body 16, and the first identification protrusion 22 and the second identification protrusion 26 are arranged at positions differing from each other in the circumferential direction in the axial projection (FIG. 4). Further, each of the first identification protrusions 22 and each of the second identification protrusions 26 are arranged at the same position as each other in the radial direction.

In brief, in this embodiment, the first identification protrusions 22 and the second identification protrusions 26 are provided in the same quantity (four) as each other and are arranged alternately in the circumferential direction in the axial projection. Particularly, in this embodiment, the first identification protrusions 22 and the second identification protrusions 26 are provided without overlapping with each other in the axial projection. Then, a comprehensive overall pattern 30 of the identification protrusions (first identification protrusions 22 and second identification protrusions 26) provided at the main rubber elastic body 16 is composed of each of the first identification protrusions 22 (first pattern 24) and each of the second identification protrusions 26 (second pattern 28).

In the main rubber elastic body 16 provided with the first identification protrusions 22 and the second identification protrusions 26 according to the comprehensive overall pattern 30, as described above, the protruding height of each of the first identification protrusions 22 from the upper surface 18 and the protruding height of each of the second identification protrusions 26 from the lower surface 20 are configured to be substantially equal. Thus, an axial length A (see FIG. 1) of the main rubber elastic body 16 at the forming position of the first identification protrusion 22 and an axial length B (see FIG. 1) of the main rubber elastic body 16 at the forming position of the second identification protrusion 26 are configured to be substantially equal. As a result, in the main rubber elastic body 16, a rubber volume (rubber weight) at the forming position of each of the first identification protrusions 22 and a rubber volume (rubber weight) at the forming position of each of the second identification protrusions 26 are configured to be substantially equal.

Further, in the main rubber elastic body 16, regions where the first identification protrusions 22 and the second identification protrusions 26 are not provided also have a predetermined shape. The first identification protrusions 22, the second identification protrusions 26, and the regions where the first identification protrusions 22 and the second identification protrusions 26 are not provided are arranged alternately and continuously in the circumferential direction. As a result, a center G of gravity of the main rubber elastic body 16 is positioned on the central axis C in the axial projection. That is, each of the first identification protrusions 22 and each of the second identification protrusions 26 have a comprehensive overall pattern 30 in which weight balance is comprehensively maintained on the central axis C of the main rubber elastic body 16.

In the axial projection, the size relationship between the regions where the first identification protrusions 22 and the second identification protrusions 26 are provided and the regions where none of the identification protrusions are provided is not particularly limited. However, in this embodiment, by appropriately setting the width dimensions of each of the first identification protrusions 22 and each of the second identification protrusions 26, the regions where the first identification protrusions 22 and the second identification protrusions 26 are provided are configured to be larger than the regions where none of the identification protrusions are provided. As a result, for example, it is also possible to well suppress spring properties in the axially perpendicular direction from changing in the circumferential direction.

More specifically, as shown in FIG. 4, in the axial projection of the main rubber elastic body 16, in the case of being divided in axially perpendicular two directions (e.g., front-rear direction FB and left-right direction LR) passing through the central axis C, the weights on two sides in each direction are configured to be equal. That is, in the main rubber elastic body 16, the weights on two sides in the front-rear direction (left-right direction in FIG. 4) are configured to be equal, and the weights on two sides in the left-right direction (up-down direction in FIG. 4) are configured to be equal. The axially perpendicular two directions passing through the central axis C are not limited to the front-rear direction FB and the left-right direction LR, and, for example, a straight line D and a straight line E orthogonal to the straight line D in FIG. 4 also apply. In the main rubber elastic body 16, the weights on two sides in the case of being divided by the straight line D and the weights on two sides in the case of being divided by the straight line E are configured to be equal, respectively. Thus, in the main rubber elastic body 16 of this embodiment, the rubber weights (rubber volumes) are configured to be equal on two sides in any axially perpendicular two directions with respect to the central axis C of the main rubber elastic body 16, so it is possible to exhibit substantially uniform rubber properties against loads from any direction, and it is possible to reduce or substantially eliminate changes in rubber properties in the circumferential direction.

Thus, in the tubular vibration damping device (dynamic damper 10) of this embodiment, since the rubber properties substantially do not change in the circumferential direction, desired rubber properties are exhibited against loads from any direction, and it is possible to reduce the risk that desired rubber properties are not exhibited against loads from specific directions as in cases where rubber properties differ in the circumferential direction, for example. Further, since the tubular vibration damping device (dynamic damper 10) may be installed without concern for the circumferential position, the installation work of the tubular vibration damping device (dynamic damper 10) can be facilitated. Furthermore, each of the first identification protrusions 22 and each of the second identification protrusions 26 are not annular as in FIG. 6 of Patent Document 2, but a plurality of first identification protrusions 22 and a plurality of second identification protrusions 26 are provided apart in the circumferential direction. Thus, stress and strain do not concentrate on the protrusion portions, and durability is also improved.

Further, in this embodiment, the first pattern 24, which is the overall pattern of each of the first identification protrusions 22, and the second pattern 28, which is the overall pattern of each of the second identification protrusions 26, are configured to be the same as a whole. Specifically, four first identification protrusions 22 and four second identification protrusions 26 are respectively provided in the circumferential direction, and the first identification protrusions 22 and the second identification protrusions 26 are respectively provided at substantially equal intervals in the circumferential direction. Further, the first identification protrusions 22 have the same shape and size as each other, and the second identification protrusions 26 have the same shape and size as each other. Each of the first identification protrusions 22 and each of the second identification protrusions 26 extend in an axially perpendicular direction with a constant width dimension to connect the inner shaft member 12 and the outer tubular member 14. Furthermore, the first identification protrusions 22 and the second identification protrusions 26 are arranged alternately in the circumferential direction in the axial projection. In this manner, by providing the first pattern 24 and the second pattern 28, which are configured to be the same as each other, respectively on one axial end surface (upper surface 18) and another axial end surface (lower surface 20) of the main rubber elastic body 16, it is easier to maintain weight balance on the central axis C in the entire main rubber elastic body 16 including each of the first identification protrusions 22 and each of the second identification protrusions 26, that is, it is possible to more reliably position the center G of gravity of the main rubber elastic body 16 on the central axis C. As a result, spring properties in the axially perpendicular direction can be more reliably prevented from changing in the circumferential direction.

In this embodiment, the first identification protrusions 22 and the second identification protrusions 26 are provided without overlapping with each other in the axial projection. Thus, the axial length of the main rubber elastic body is prevented from changing at the otherwise overlapping portion between the first identification protrusion and the second identification protrusion, and rubber properties are prevented from changing at specific positions in the circumferential direction.

The inventor of the disclosure has prototyped a dynamic damper 10 according to this embodiment, and has conducted an acceleration response test by sweep excitation during 1G excitation in axially perpendicular directions, for each of a direction (straight line a in FIG. 4) rotated by 22.5 degrees in the circumferential direction around the central axis and a direction (straight line b in FIG. 4) rotated by 45 degrees in the circumferential direction around the central axis, with 0 degrees (straight line LR in FIG. 4) serving as a reference. As a result, no significant differences have been observed in each of the directions of 0 degrees, 22.5 degrees, and 45 degrees, and it has been confirmed that spring properties in the axially perpendicular direction are suppressed from changing in the circumferential direction.

Figure 5:
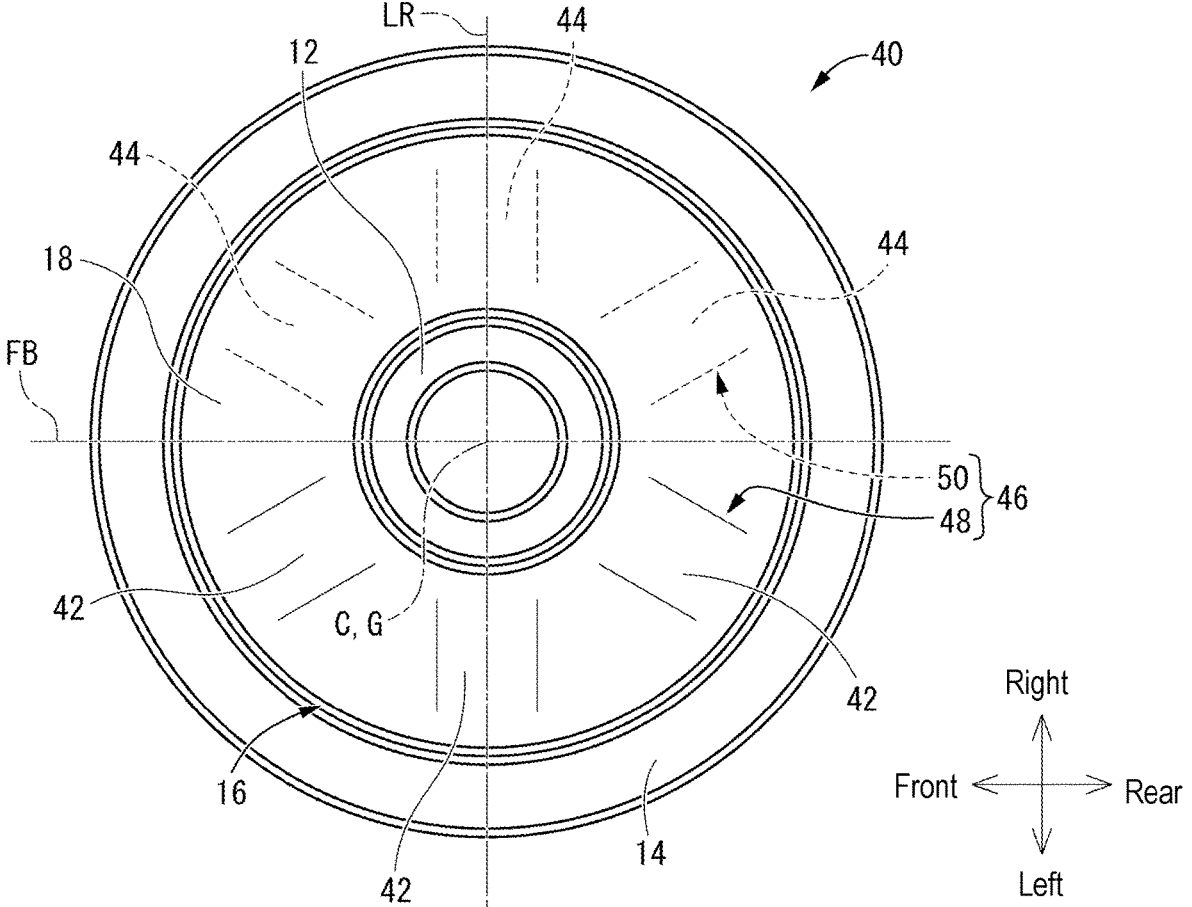
FIG. 5 is a view corresponding to FIG. 4, showing a tubular vibration damping device as a second embodiment of the disclosure.

Next, in FIG. 5, a dynamic damper 40 is shown as a second embodiment of the tubular vibration damping device according to the disclosure. In this embodiment, compared to the dynamic damper 10 in the first embodiment, a comprehensive overall pattern 46 composed of each of first identification protrusions 42 and each of second identification protrusions 44 is different. In the following description, members and parts substantially identical to those in the above embodiment will be labeled with the same reference signs as the above embodiment in the drawings, and detailed descriptions thereof will be omitted.

In this embodiment, on the left side (lower side in FIG. 5) of the upper surface 18 of the main rubber elastic body 16, three first identification protrusions 42 are provided apart from each other at substantially equal intervals (at intervals of approximately 60 degrees), and a first pattern 48 is composed of each of the first identification protrusions 42 as an overall pattern of the first identification protrusions 42. Further, on the right side (upper side in FIG. 5) of the lower surface of the main rubber elastic body 16, three second identification protrusions 44 are provided apart from each other at substantially equal intervals (at intervals of approximately 60 degrees), and a second pattern 50 is composed of each of the second identification protrusions 44 as an overall pattern of the second identification protrusions 44. Then, a comprehensive overall pattern 46 of this embodiment is composed of the first pattern 48 and the second pattern 50. In the comprehensive overall pattern 46 of this embodiment, in an axial projection, the first identification protrusions 42 and the second identification protrusions 44 are provided at substantially equal intervals (at intervals of approximately 60 degrees) in the circumferential direction. In this embodiment as well, each of the first identification protrusions 42 and each of the second identification protrusions 44 are formed with a constant width dimension and extend in an axially perpendicular direction to connect the inner shaft member 12 and the outer tubular member 14.

Similarly, with such a comprehensive overall pattern 46, in the case where the main rubber elastic body 16 is divided in the front-rear direction FB or the left-right direction LR, which is axially perpendicular two directions, the rubber weights on two sides in each direction become the same. The same applies to axially perpendicular two directions other than the front-rear direction FB or the left-right direction LR. Thus, it is possible to position the center G of gravity of the main rubber elastic body 16 on the central axis C in the axial projection. Further, with the comprehensive overall pattern 46 composed of each of the first identification protrusions 42 and each of the second identification protrusions 44, the main rubber elastic body 16 can maintain weight balance on the central axis C. As a result, in the dynamic damper 40 of this embodiment as well, it is possible to exhibit the same effect as that of the dynamic damper 10 in the first embodiment.

That is, in the tubular vibration damping device (dynamic damper) according to the disclosure, the first identification protrusions and the second identification protrusions are not required to be arranged evenly in the circumferential direction on one axial end surface or another axial end surface of the main rubber elastic body, but may be provided disproportionately on one side in the front-rear direction FB or the left-right direction LR, for example. Further, it is not required for the first identification protrusions and the second identification protrusions to be alternately provided in the circumferential direction in the axial projection.

Figure 6:
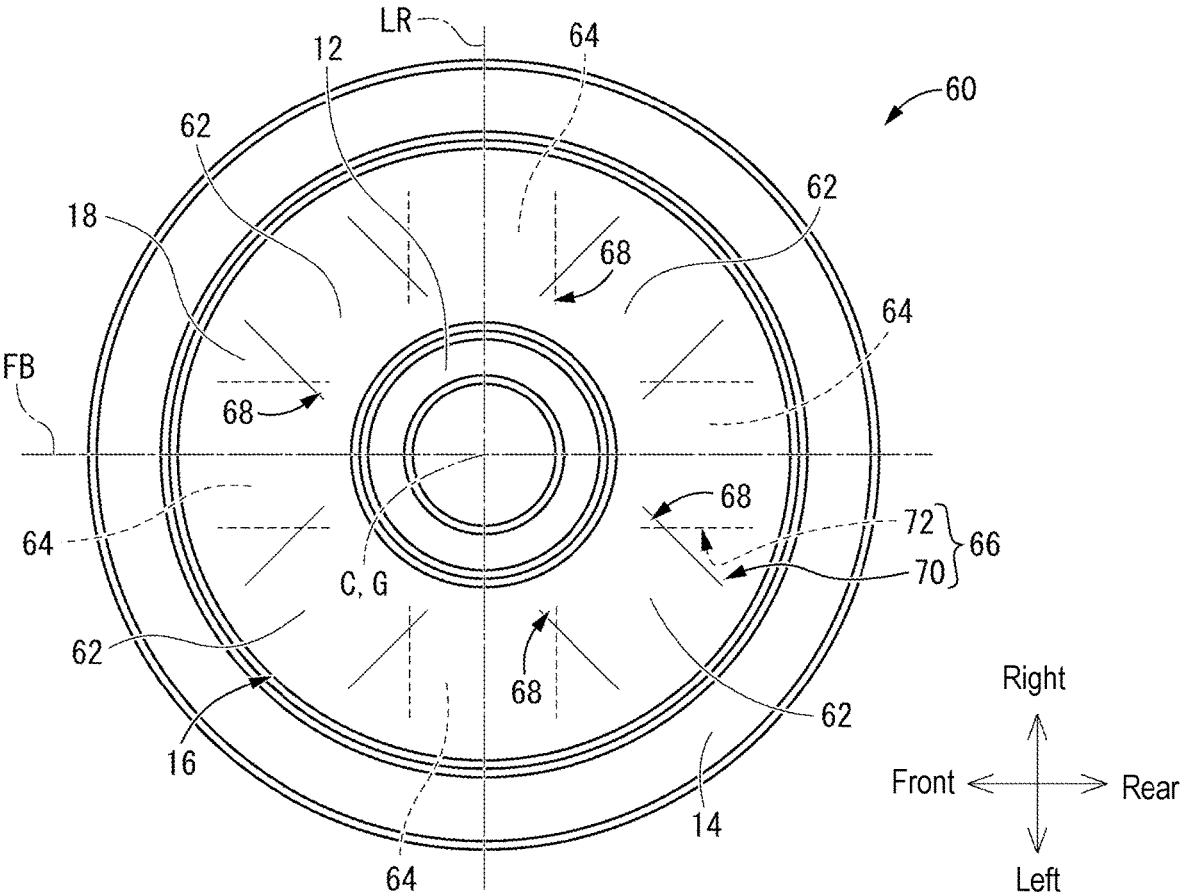
FIG. 6 is a view corresponding to FIG. 4, showing a tubular vibration damping device as a third embodiment of the disclosure.

Next, FIG. 6 shows a dynamic damper 60 as a third embodiment of the tubular vibration damping device according to the disclosure. In this embodiment, the width dimensions of each of first identification protrusions 62 and each of second identification protrusions 64 are configured to be larger than those of the dynamic damper 10 in the first embodiment. As a result, in a comprehensive overall pattern 66 of this embodiment, overlapping parts 68 are formed by partially overlapping the first identification protrusions 62 and the second identification protrusions 64 in an axial projection. In this embodiment as well, each of the first identification protrusions 62 and each of the second identification protrusions 64 are formed with a constant width dimension and extend in an axially perpendicular direction to connect the inner shaft member 12 and the outer tubular member 14.

That is, a first pattern 70 as an overall pattern formed of each of the first identification protrusions 62 and a second pattern 72 as an overall pattern formed of each of the second identification protrusions 64 respectively have basically similar shapes to the first pattern 24 and the second pattern 28 in the first embodiment. However, by increasing the width dimensions of each of the first identification protrusions 62 and each of the second identification protrusions 64, a plurality of overlapping parts 68 are formed at inner peripheral ends of each of the first identification protrusions 62 and each of the second identification protrusions 64. In brief, the portions at which the first pattern 70 and the second pattern 72 overlap with each other in the axial projection form the overlapping parts 68. The overlapping parts 68 are formed on two circumferential sides of the inner peripheral ends of each of the first identification protrusions 62 or each of the second identification protrusions 64, and in this embodiment, eight overlapping parts 68 are formed apart from each other in the circumferential direction at substantially equal intervals (at intervals of approximately 45 degrees).

Similarly, with the comprehensive overall pattern 66 having such a shape, since the overlapping parts 68 are formed at substantially equal intervals in the circumferential direction, in the case where the main rubber elastic body 16 is divided in the front-rear direction FB or the left-right direction LR, which is axially perpendicular two directions, or in other axially perpendicular two directions, the rubber weights on two sides in each direction become the same. Thus, it is possible to position the center G of gravity of the main rubber elastic body 16 on the central axis C in the axial projection. Further, with the comprehensive overall pattern 66 composed of each of the first identification protrusions 62 and each of the second identification protrusions 64, the main rubber elastic body 16 can maintain weight balance on the central axis C. As a result, in the dynamic damper 60 of this embodiment as well, it is possible to exhibit the same effect as that of the dynamic damper 10 of the first embodiment.

Figure 7:
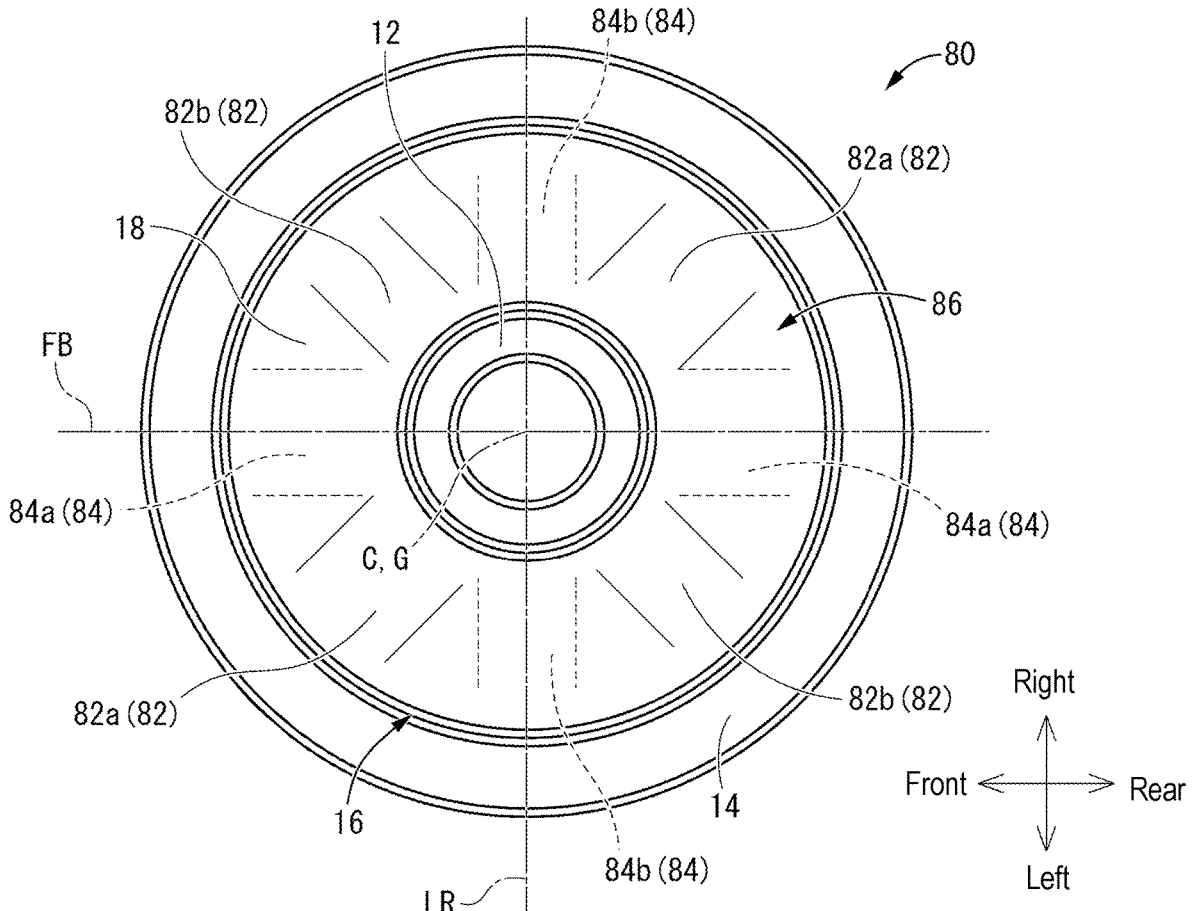
FIG. 7 is a view corresponding to FIG. 4, showing a tubular vibration damping device as a fourth embodiment of the disclosure.

Next, FIG. 7 shows a dynamic damper 80 as a fourth embodiment of the tubular vibration damping device according to the disclosure. In this embodiment as well, four first identification protrusions 82 are provided apart from each other in the circumferential direction on the upper surface 18 of the main rubber elastic body 16. However, among the first identification protrusions 82, two first identification protrusions 82 (upper-right and lower-left ones in FIG. 7) opposed to each other in the radial direction are first identification protrusions 82a and 82a having a relatively large width dimension, and the two remaining first identification protrusions 82 (upper-left and lower-right ones in FIG. 7) opposed to each other in the radial direction are first identification protrusions 82b and 82b having a relatively small width dimension. Similarly, four second identification protrusions 84 are provided apart from each other in the circumferential direction on the lower surface 20. However, among the second identification protrusions 84, two second identification protrusions 84 (two sides in the left-right direction in FIG. 7) opposed to each other in the radial direction are second identification protrusions 84a and 84a having a relatively large width dimension, and the two remaining second identification protrusions 84 (two sides in the up-down direction in FIG. 7) opposed to each other in the radial direction are second identification protrusions 84b and 84b having a relatively small width dimension.

For example, the first identification protrusions 82a and the second identification protrusions 84a having relatively large width dimensions may overlap with each other in the axial projection to form a plurality of overlapping parts 68. In such a case, the plurality of overlapping parts 68 are formed in corresponding sizes at positions opposed to each other in the radial direction.

Similarly, with a comprehensive overall pattern 86 having such a shape, in the case where the main rubber elastic body 16 is divided in the front-rear direction FB or the left-right direction LR, which is axially perpendicular two directions, or in other axially perpendicular two directions, the rubber weights on two sides in each direction become the same. Thus, it is possible to position the center G of gravity of the main rubber elastic body 16 on the central axis C in the axial projection. Further, with the comprehensive overall pattern 86 composed of each of the first identification protrusions 82 and each of the second identification protrusions 84, the main rubber elastic body 16 can maintain weight balance on the central axis C. As a result, in the dynamic damper 80 of this embodiment as well, it is possible to exhibit the same effect as that of the dynamic damper 10 of the first embodiment.

Figure 8:
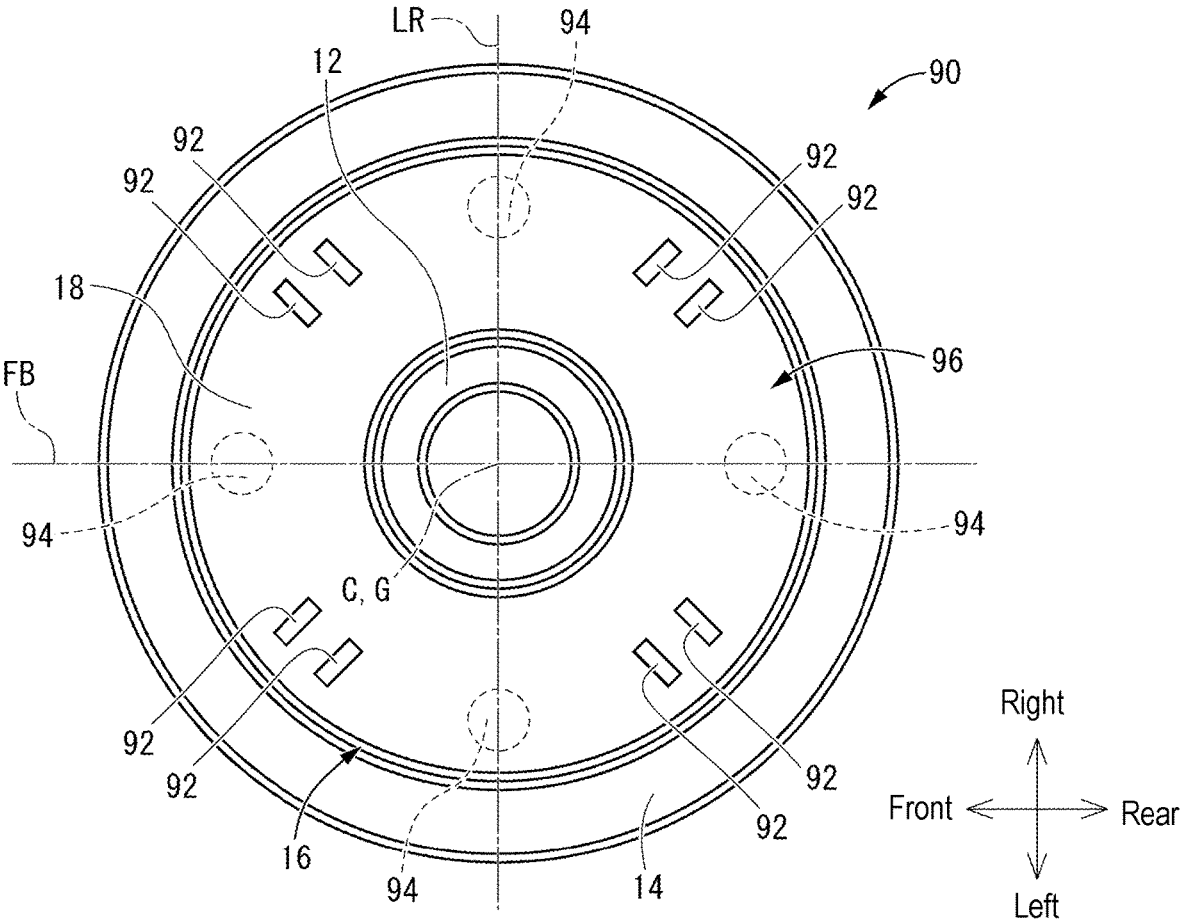
FIG. 8 is a view corresponding to FIG. 4, showing a tubular vibration damping device as a fifth embodiment of the disclosure.

Next, FIG. 8 shows a dynamic damper 90 as a fifth embodiment of the tubular vibration damping device according to the disclosure. In this embodiment, each of first identification protrusions 92 and each of second identification protrusions 94 are not provided to connect the inner shaft member 12 and the outer tubular member 14, and each of the first identification protrusions 92 and each of the second identification protrusions 94 are provided at positions apart from the inner shaft member 12 and the outer tubular member 14 in the radial direction. In particular, in this embodiment, each of the first identification protrusions 92 is provided at an outer peripheral portion of the upper surface 18 of the main rubber elastic body 16, and each of the second identification protrusions 94 is provided at an outer peripheral portion of the lower surface 20. The first identification protrusions 92 and the second identification protrusions 94 are formed at positions substantially corresponding to each other in the radial direction of the main rubber elastic body 16.

Specifically, the first identification protrusion 92 is provided at upper-right, lower-right, upper-left, and lower-left portions of the upper surface 18 in FIG. 8, and a pair of first identification protrusions 92 and 92 are provided close to each other at each of these portions. That is, a total of eight first identification protrusions 92 are provided on the upper surface 18 of the main rubber elastic body 16. Each of the first identification protrusions 92 has a substantially rectangular shape in a plan view (axial projection) and is arranged in an orientation in which the radial direction of the main rubber elastic body 16 is the longitudinal direction. Further, the second identification protrusion 94 is provided on two sides in the up-down direction and two sides in the left-right direction of the lower surface 20 in FIG. 8, and a total of four second identification protrusions 94 are provided. Each of the second identification protrusions 94 has a substantially circular shape in the axial projection and is formed in, for example, a substantially cylindrical shape or a substantially hemispherical shape.

Similarly, with a comprehensive overall pattern 96 having such a shape, in the case where the main rubber elastic body 16 is divided in the front-rear direction FB or the left-right direction LR, which is axially perpendicular two directions, or in other axially perpendicular two directions, the rubber weights on two sides in each direction become the same. Thus, it is possible to position the center G of gravity of the main rubber elastic body 16 on the central axis C in the axial projection. Further, with the comprehensive overall pattern 96 composed of each of the first identification protrusions 92 and each of the second identification protrusions 94, the main rubber elastic body 16 can maintain weight balance on the central axis C. As a result, in the dynamic damper 90 of this embodiment as well, it is possible to exhibit the same effect as that of the dynamic damper 10 of the first embodiment.

Although the first to fifth embodiments of the disclosure have been described above, the disclosure is not limited to the specific descriptions in these embodiments but may be implemented with various changes, modifications, and improvements based on the knowledge of those skilled in the art.

The first identification protrusion and the second identification protrusion described in the embodiments are simply examples, and as long as the main rubber elastic body has a weight balance on the central axis, there is no limitation on the shapes, sizes, and arrangement patterns (i.e., first pattern and second pattern) of each of the first identification protrusions and/or each of the second identification protrusions. That is, for example, in the embodiments above, each of the first identification protrusions and each of the second identification protrusions are formed at substantially the same position in the radial direction, but each of the first identification protrusions and each of the second identification protrusions may also be provided at positions differing in the radial direction. Further, for example, in the first to fourth embodiments, each of the first identification protrusions and/or each of the second identification protrusions may be divided in the radial direction. In addition, although four first identification protrusions and four second identification protrusions are provided in the circumferential direction in the first, third, and fourth embodiments, the quantities of the first identification protrusions and the second identification protrusions are not limited, and three first identification protrusions and three second identification protrusions may also be provided in the circumferential direction as in the second embodiment, or four or more first identification protrusions and/or four or more second identification protrusions may also be provided in the circumferential direction.

Further, in the embodiments above, the tubular vibration damping device is adopted as the dynamic dampers 10, 40, 60, 80, and 90, but the tubular vibration damping device according to the disclosure may also be mounted on a vehicle and applied to a power unit mount or a suspension bush, or may be applied as a tubular vibration damping device for a purpose other than a vehicle. In the case of being applied as a tubular vibration damping device, it may be a solid type tubular vibration damping device as in the embodiments above, or it may be a fluid-filled type tubular vibration damping device with fluid sealed inside.

What is claimed is:

1. A tubular vibration damping device, comprising an inner shaft member and an outer tubular member connected by a main rubber elastic body,
   the tubular vibration damping device further comprising a plurality of first identification protrusions protruding outward and a plurality of second identification protrusions protruding outward, wherein the plurality of first identification protrusions are formed apart in a circumferential direction on one axial end surface of the main rubber elastic body, and the plurality of second identification protrusions are formed apart in the circumferential direction on another axial end surface,
   the first identification protrusion and the second identification protrusion are arranged at positions differing from each other in the circumferential direction in an axial projection,
   a protruding height of the first identification protrusion from the one axial end surface and a protruding height of the second identification protrusion from the another axial end surface do not exceed an inner peripheral end and an outer peripheral end of the main rubber elastic body, and
   the first identification protrusion and the second identification protrusion have a comprehensive overall pattern in which weight balance is comprehensively maintained on a central axis of the main rubber elastic body,
   wherein the first identification protrusion and the second identification protrusion do not overlap with each other in the axial projection.

2. The tubular vibration damping device according to claim 1, wherein the plurality of first identification protrusions have an overall pattern that is the same as an overall pattern of the plurality of second identification protrusions.

3. The tubular vibration damping device according to claim 1, wherein the plurality of first identification protrusions have a same size and a same shape, and the plurality of second identification protrusions have a same size and a same shape.

4. The tubular vibration damping device according to claim 1, wherein both the first identification protrusion and the second identification protrusion extend in an axially perpendicular direction with a constant width dimension.

5. The tubular vibration damping device according to claim 1, wherein the first identification protrusion and the second identification protrusion are provided in a same quantity as each other and are arranged alternately in the circumferential direction in the axial projection.

6. The tubular vibration damping device according to claim 1, wherein both the first identification protrusion and the second identification protrusion are arranged at equal intervals in the circumferential direction.

7. The tubular vibration damping device according to claim 1, wherein four or more first identification protrusions are formed in the circumferential direction, and four or more second identification protrusions are formed in the circumferential direction.

8. The tubular vibration damping device according to claim 1, wherein with the inner shaft member attached to a vibration control target, the outer tubular member serves as a mass member to constitute a dynamic damper.

9. The tubular vibration damping device according to claim 1, wherein the inner peripheral end of the main rubber elastic body is disposed between the first identification protrusion and the inner shaft member, and between the second identification protrusion and the inner shaft member, the outer peripheral end of the main rubber elastic body is disposed between the first identification protrusion and the outer tubular member, and between the second identification protrusion and the outer tubular member.

* * * * *